(12) United States Patent
Ramsey

(10) Patent No.: US 7,533,421 B2
(45) Date of Patent: May 12, 2009

(54) METHOD FOR ENCODING AND DECODING CONFIDENTIAL OPTICAL DISC

(75) Inventor: Don Ramsey, Shindian (TW)

(73) Assignee: Cyberlink Corp., Shindian, Taipei (TW)

( * ) Notice: Subject to any disclaimer, the term of this patent is extended or adjusted under 35 U.S.C. 154(b) by 762 days.

(21) Appl. No.: 10/666,716

(22) Filed: Sep. 19, 2003

(65) Prior Publication Data

US 2005/0066117 A1    Mar. 24, 2005

(51) Int. Cl.
*G06F 12/14* (2006.01)
(52) U.S. Cl. .................. 726/27; 726/2; 726/26; 726/28; 713/189; 713/193; 707/9
(58) Field of Classification Search ............... 713/182, 713/183, 168, 173, 189, 193; 711/163–164, 711/112; 726/2–4, 26–28, 10; 707/1, 205, 707/9; 369/83, 84, 53.21
See application file for complete search history.

(56) References Cited

U.S. PATENT DOCUMENTS

| | | | |
|---|---|---|---|
| 6,463,022 B1 * | 10/2002 | Ito et al. ................. | 369/53.24 |
| 6,490,683 B1 * | 12/2002 | Yamada et al. ............. | 713/176 |
| 6,675,257 B1 * | 1/2004 | Khalid et al. ............... | 711/111 |
| 6,738,877 B1 * | 5/2004 | Yamakawa et al. .......... | 711/164 |
| 6,775,803 B1 * | 8/2004 | Chung et al. ................ | 714/763 |
| 6,907,187 B2 * | 6/2005 | Ando et al. ................ | 386/95 |
| 6,954,862 B2 * | 10/2005 | Serpa ............................ | 726/5 |
| 6,963,952 B1 * | 11/2005 | La .............................. | 711/112 |
| 7,024,534 B2 * | 4/2006 | Sasaki et al. ............... | 711/170 |
| 2001/0037357 A1 * | 11/2001 | Anzai et al. ................ | 709/203 |
| 2001/0044887 A1 * | 11/2001 | Ohgake ........................ | 711/163 |
| 2002/0051630 A1 * | 5/2002 | Sasaki et al. ............... | 386/125 |
| 2002/0064113 A1 * | 5/2002 | Geeslin ................... | 369/53.21 |
| 2003/0126596 A1 * | 7/2003 | Kim ............................ | 725/30 |
| 2003/0204754 A1 * | 10/2003 | Cromer et al. .............. | 713/202 |
| 2005/0015608 A1 * | 1/2005 | Peterson ..................... | 713/193 |

OTHER PUBLICATIONS

"Nero Burning ROM 5.5 Manual" Ahead Software, 2001.*

* cited by examiner

*Primary Examiner*—Kambiz Zand
*Assistant Examiner*—Yin-Chen Shaw
(74) *Attorney, Agent, or Firm*—Thomas, Kayden, Horstemeyer & Risley

(57) ABSTRACT

The present invention relates to a method of encoding and decoding an optical disc, which could contain both confidential data and public viewing data. The method manipulates on the file system of the optical disc and protects the confidential data with ID field, password entry mechanism and burner/player/reader using the method of the present invention. Further, the present invention provides control over types of audience and time of viewing since ordinary optical disc player can only play public viewing data and the present invention complying player will be able to play the confidential data providing with correct password and ID field.

34 Claims, 9 Drawing Sheets

METHOD FOR ENCODING AND DECODING CONFIDENTIAL OPTICAL DISC

BACKGROUND OF THE INVENTION

1. Field of the invention

The present invention relates to method of encoding and reading confidential optical disc. More particularly the present invention relates to method of encoding optical disc by manipulating the file system and reading the produced optical disc with confidential protection of ID field, password and entries limitation mechanism.

2. Description of Prior-Art

In the field of disc encoding and decoding technology many methods has been developed. Most of encoded optical disc contains data that uses different standard file system can be viewed by general player/reader. There are also many encrypting methods that cooperate with encoding methods to protect the confidential data contained. In the current market, most data containing discs either holds public viewing data or confidential data. The two types of data could not be held by the same optical disc. Further, the outcome products of confidential data containing optical disc are mostly protected by encryption only and all player/reader could read the disc if correct password given. Furthermore, if the password is lost or deciphered there are no further mechanisms to protect the data within the disc. Nevertheless, many various encrypting processes are not easily understood or used by public. There is no easy and safe system yet on the market for general user to make their private disc. The safety measure should be higher and robust to password decipher.

SUMMARY OF THE INVENTION

The presentation was produced after reviewing the above-mentioned prior-art. It is designed to cater for people who want to make some private or confidential videos/movies/files that are not for public viewing. Further, one might also want certain people to be able to view those videos/movies/data at certain time. Hence, the method of the present invention is invented to accomplish these goals.

The present invention provides a method for encoding and decoding a confidential optical disc. According to the present invention, a produced optical disc can contain both public and confidential viewing data. Both data are organized and stored under a file system, but in different manner. Wherein a specified ID field and password that are only functional on burner/player/reader using the method according to the present invention to further protect the confidential data from exposing to unauthorized party.

It is an objective of the present invention to provide a method for encoding a confidential optical disc. The method requires a password and data source before starting to create public viewing (dummy) and confidential viewing (real) data according to file system. Wherein the directory tree containing addresses to real data in the file system is hidden away in a secret location that only burner/player using the method according to present invention with correct password and ID field can locate.

It is another objective of the present invention to provide a method for reading a confidential optical disc created by the production method described in this invention. The method involves a player/reader with function of verifying ID field and identifying whether if the disc contains any confidential data. The confidential data is further protected from any unauthorized party by a password verification and entries restriction mechanism.

The method of the present invention gives the facility of having both public and confidential viewing data on an optical disc, which is easily made with a burner using the method according to the present invention. A person must possess both password and optical disc made with the present invention in order to access the hidden confidential data using the player/reader functioning according to the method of present invention. Hence, without any one of the three above factors will not put the confidential data to the risk of being exposed. Consequently, one has the control on assigning different audiences for viewing different type of data. Further, time of viewing is also possible to determine and control since it is the time one grants another party the possession of both password and optical disc made by the present invention, providing that another party is using the player which is practicing the method according to the present invention.

It is to be understood that both the foregoing general description and the following detailed description are exemplary, and are intended to provide further explanation of the invention as claimed.

DESCRIPTION OF THE PREFERRED EMBODIMENT

Reference will now be made in detail to the present preferred embodiment of the invention, examples of which are illustrated in the accompany drawings There are two main preferred embodiments for the present invention. The first embodiment relates to an encoding process for an optical disc of the present invention and the second embodiment relates to a reading process for an optical disc of the present invention. However, before we reveal both embodiments, some pre-knowledge pertains to optical disc volume layout and file systems in the present invention must be given.

Figure 1:
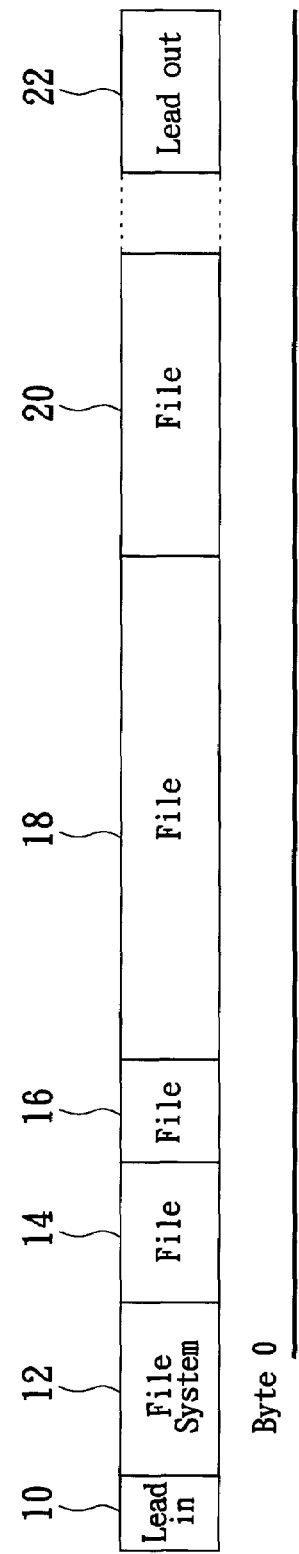
FIG. 1 is the schematic diagram of an optical disc volume layout.

Please refer to FIG. 1 the schematic diagram of an optical disc volume layout. The diagram shows a linear frame with segments representing the physical data on the tracks of an optical disc. The linear frame contains many segments of different properties and usages. Some segments may further contain other sub-segments of information. The first segment on the linear from is a lead-in zone 10 containing some basic information about an optical disc player for identifying the general properties of an optical disc (e.g. sync sectors and control data including disc key and other information). Relatively, there is also a lead-out zone 22 at the end of the linear frame. Between the lead-in zone 10 and lead-out zone 22 is the file system and data area, which holds the data content of the disc. The data content in this diagram for example are file 14, file 16, file 18 and file 20. Further, in front of all the data files is a file system 12, which defines way of storing files with directions and information about them on an optical disc. A file system is public known and applied to all optical disc. It is a standard way of managing the whole file structure and sorting data. Two possible file systems namely ISO 9660 and UDF Bridge can be applied to the optical disc in the preferred embodiment of the present invention.

Figure 2:
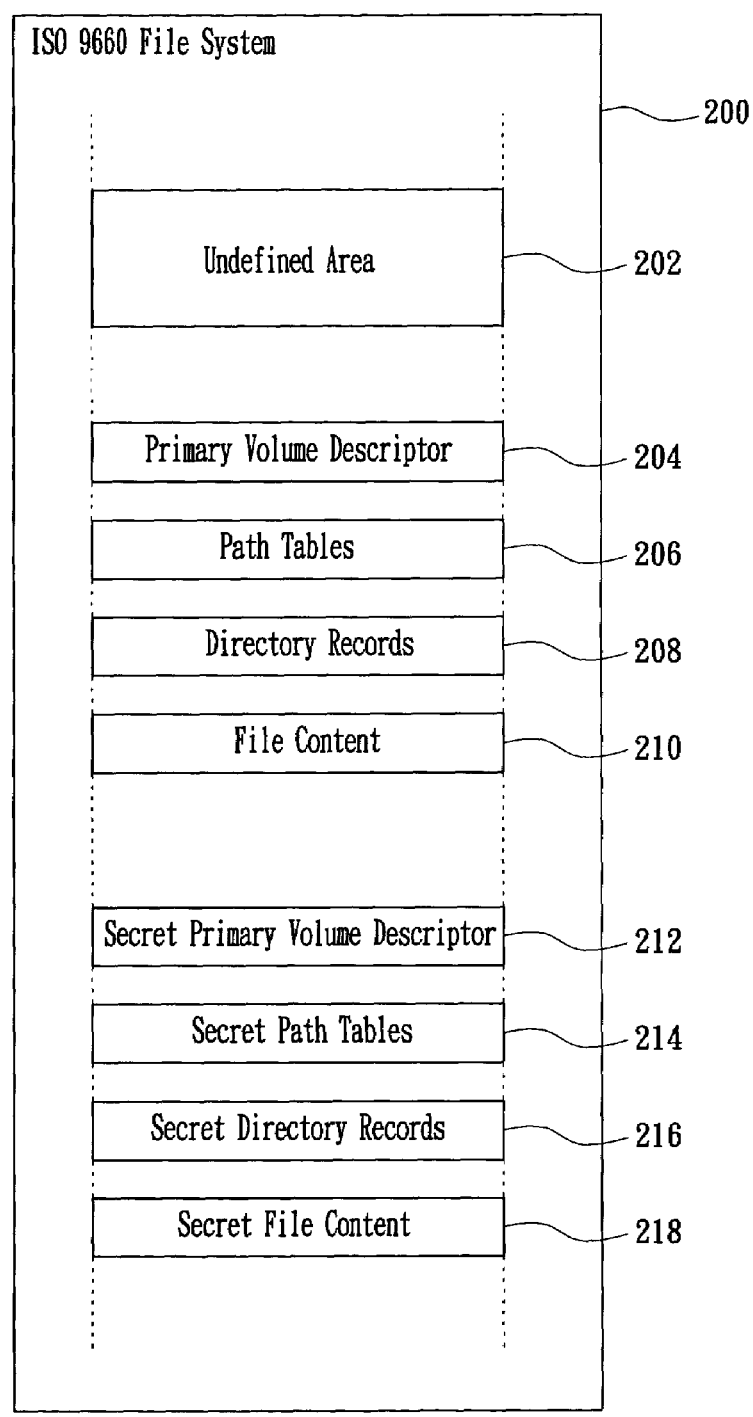
FIG. 2 is the schematic diagram of ISO 9660 file system extraction that relates to the preferred embodiment of the present invention.

The mentioned file system contains descriptors that describe the properties of a whole directory of folders and files. Refer to FIG. 2 the schematic diagram of ISO 9660 file system extraction that relates to the preferred embodiment of the present invention. The diagram shows an ISO 9660 file system 200 with the content that relates to the present invention. A primary volume descriptor 204 contains the addresses that point to a path table 206 and directory records 208. The path table 206 further contains addresses that point to other directory records 208. The directory records 208 also have other addresses that point to other directory records 208 and data addresses that point to file contents 210, which is the actual data on the disc. The path tables 206, directory records 208 and file content 210 described above is the standard directory and files that can be read by any optical disc player, because they are located at the standard addresses of the ISO 9660 file system 200. There are also spaces in the ISO 9660 file system that is unused and denoted as Undefined Area 202. However, in the preferred embodiment of the present invention, user can specify their secret primary volume descriptor 212, secret path table 214, secret directory records 216 and secret file content 218 to be stored in these undefined area 202 or in the other places file system where only known by a player/reader using the method of the present invention.

Figure 3:
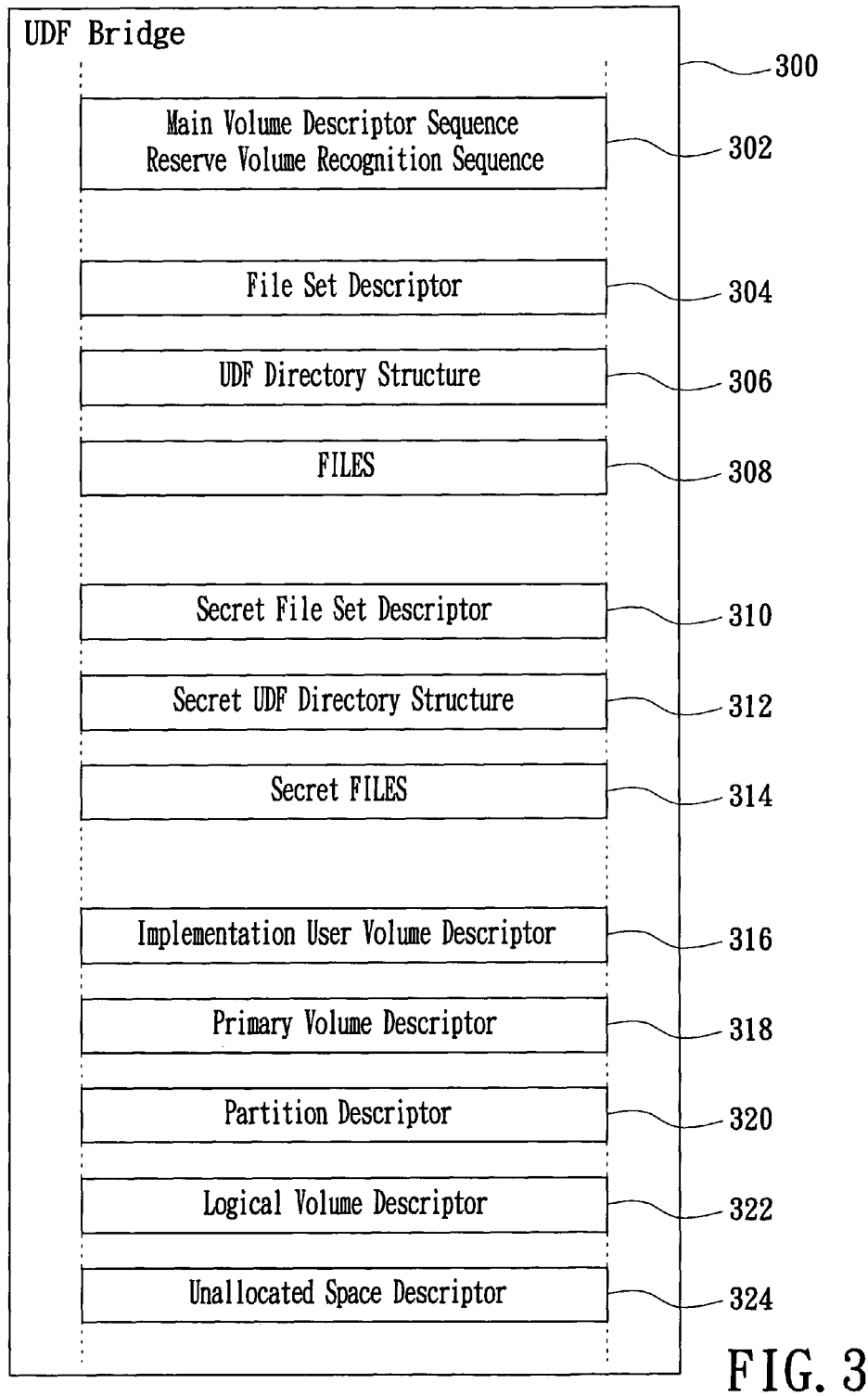
FIG. 3 is the schematic diagram containing extraction of UDF Bridge file system that relates to the preferred embodiment of the present invention.

The UDF (Universal Disk Format) is a file system standard format that was developed to overcome the limitations of ISO 9660 file system and ensuring consistency of data written to various optical discs. Hence, UDF is installed to all players/readers in order to read all optical discs. Now, refer to FIG. 3 the schematic diagram containing extraction of UDF bridge file system that relates to the preferred embodiment of the present invention. The UDF Bridge file system in the diagram shown contains a main volume descriptor sequence and reserve volume recognition sequence 302, which contains addresses that point to other descriptors such as file set descriptor 304. Wherein the file set descriptor 304 is the descriptor known by all optical disc burner/reader/player because it is located at the position specified by the UDF Bridge file system. In the file set descriptor 304, there is at least an address which points to a root directory record of a directory tree in UDF. Wherein, the directory tree is stored in the UDF specified location, namely UDF directory structure 306. The directory tree consists of root directory record, directory records and file records. Further, data addresses are stored in the file records and they point to the locations of files 308, which containing actual data content stored in optical disc under the UDF system. The files 308 in UDF stores the actual data that will be read by optical disc reader/player. Further, the precedent mentioned file set descriptor 304, UDF directory structure 306 and files 308 are described as the standard directory and files that can be read by any optical disc reader/player. Because the locations of all these are specified in UDF, hence they are known by all optical disc burner/player/reader as a universal format.

In the preferred embodiment of the present invention, however, includes a secret file set descriptor 310, which is pointed by the address stored in the sequence 302 and can only be found by a optical disc player/reader using the method according to the present invention (e.g. Power DVD). The secret file set descriptor 310 stores a preset address that points to a root directory record of a real directory tree in UDF system. This real directory tree is stored in a secret UDF directory structure 312 and containing root directory record, directory records and file records. Wherein the file records hold some data addresses that point to the actual data content of the optical disc inside a secret files 314. The precedent mentioned secret file set descriptor 310, secret UDF directory structure 312 and secret files 314 are named non-standard directory and files and can only be found by a present invention complying reader/player. Hence, a reserve data can be stored in UDF file system separately from standard data.

In addition, there are other descriptors in the UDF bridge file system 300 such as implementation use volume descriptor 316, primary volume descriptor 318, partition descriptor 320, logical volume descriptor 322 and unallocated space descriptor 324. These descriptors can also store information (e.g. directory tree) if there is any unused space in them.

The two above-mentioned ISO 9660 and UDF bridge file systems can both apply to the present invention. However, the following preferred embodiments would mainly describe on base of the UDF system. The subtle differences between implementations of the two systems will be pointed out only where necessary. However, a person skills in art should readily understand the concept behind.

First Preferred Embodiment

The present invention relates to a method for encoding and decoding a confidential optical disc. In order to achieve the confidentiality of the disc, the present invention defines two different data on an optical disc; they are dummy data and real data. Wherein a general optical disc reader/player can only read dummy data and in contrast, the real data could only be found and read by specified optical disc reader/player (e.g. Cyberlink's Power DVD player).

Figure 4:
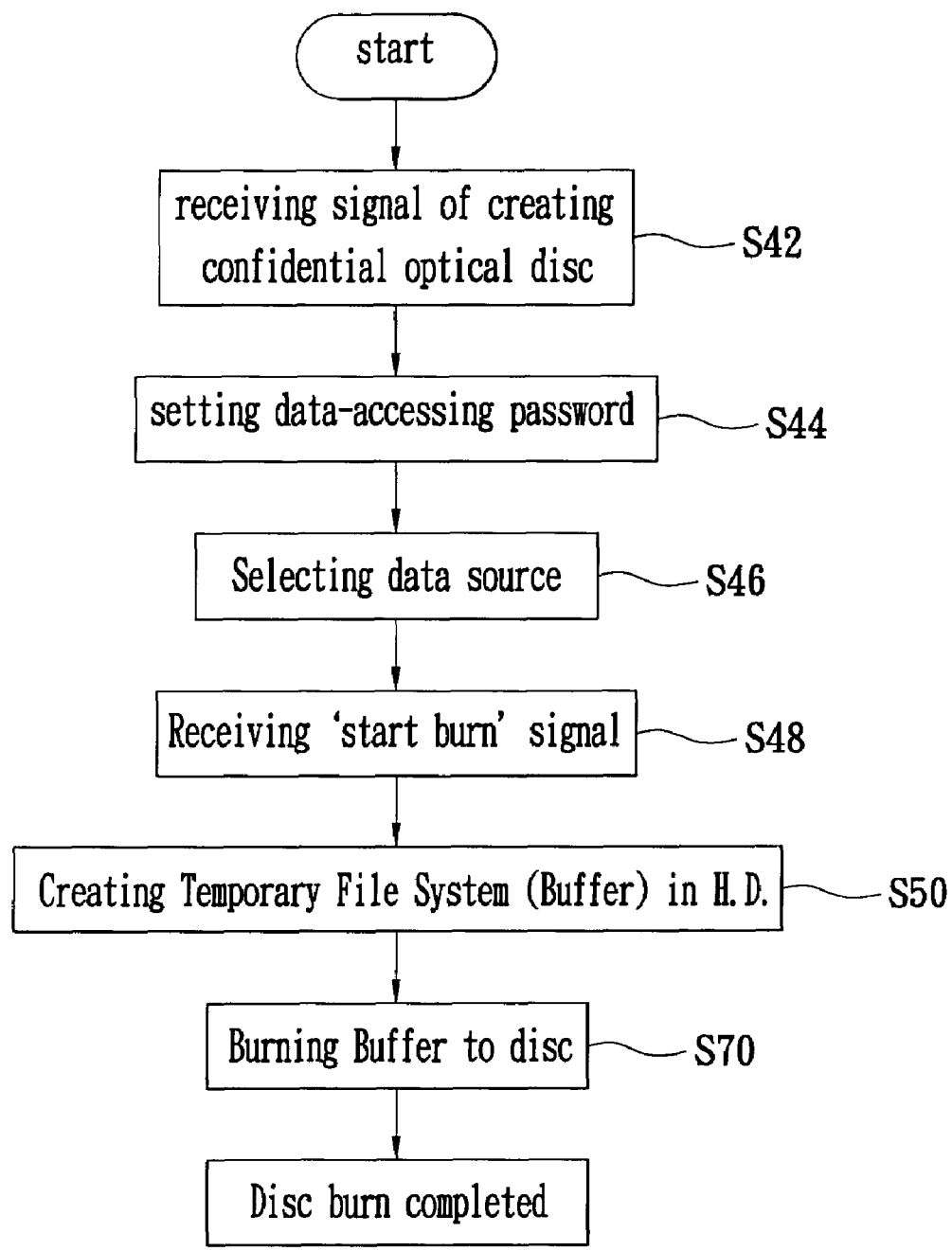
FIG. 4 is a flow-chart of a confidential optical disc encoding process in the present invention.

Please refer to FIG. 4: flow-chart of a confidential optical disc encoding process in the present invention. After a signal of creating confidential optical disc S42 has been received by a present invention complying optical disc burner, which is normally associated with a computer, the burner would switch to a confidential disc burning mode and promptly requesting for a data-accessing password S44. This data-accessing password S44 will be used for accessing data in the reading process later. After the burner has received a data-accessing password, a pre-selected data and an actual specified data source would be given to the optical disc burner from a sample menu and actual specified data source respectively S46. The pre-selected data is named as dummy data and the actual specified data is the real data in the present invention. Next, the optical disc burner would receive a start burning signal S48 and start the disc burner process up on completion of the above steps. The next step is for the associated computer to create a temporary file system (Buffer) in its hard disc S50. Once the temporary file system has been completely set up, the disc burner performs the physical burning process on an optical disc S70. In this way, a confidential optical disc is created up on completion of the burning process.

The step of creating temporary file system S50 and burn buffer to disc S70 in the above mentioned encoding process each consists of further steps that would be described in details bellow.

There are two major stages in the step of creating temporary file system S50. They are: creating standard file set 50A and crating parallel file set with real data 50B. These two stages are created in a hard disc of an associated computer for temporary storing the file system before they are burned to onto optical disc.

Figure 5:
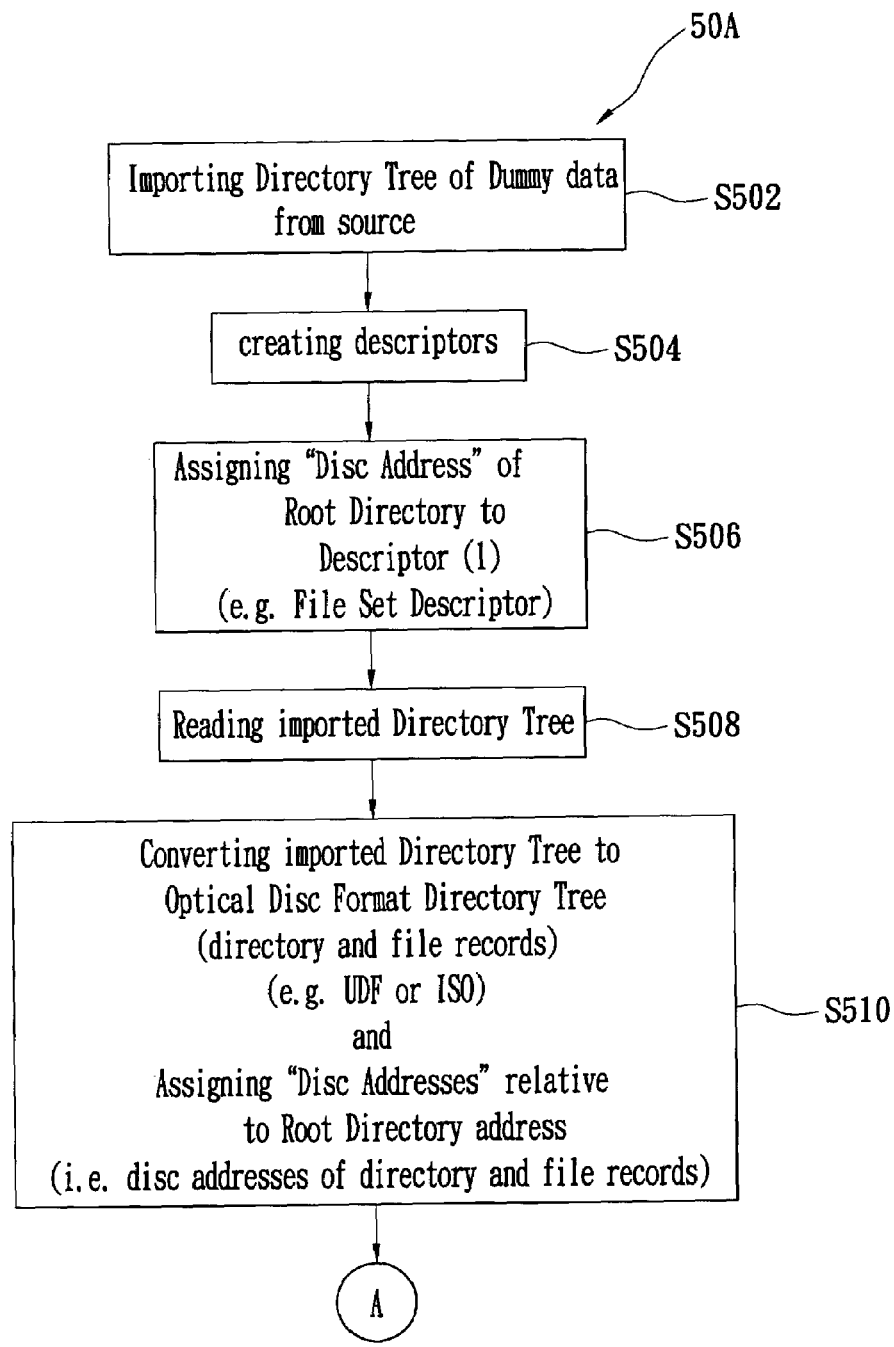
FIG. 5 is a first sub-flow-chart of the confidential disc encoding process in the preferred embodiment of the present invention.
Figure 8:
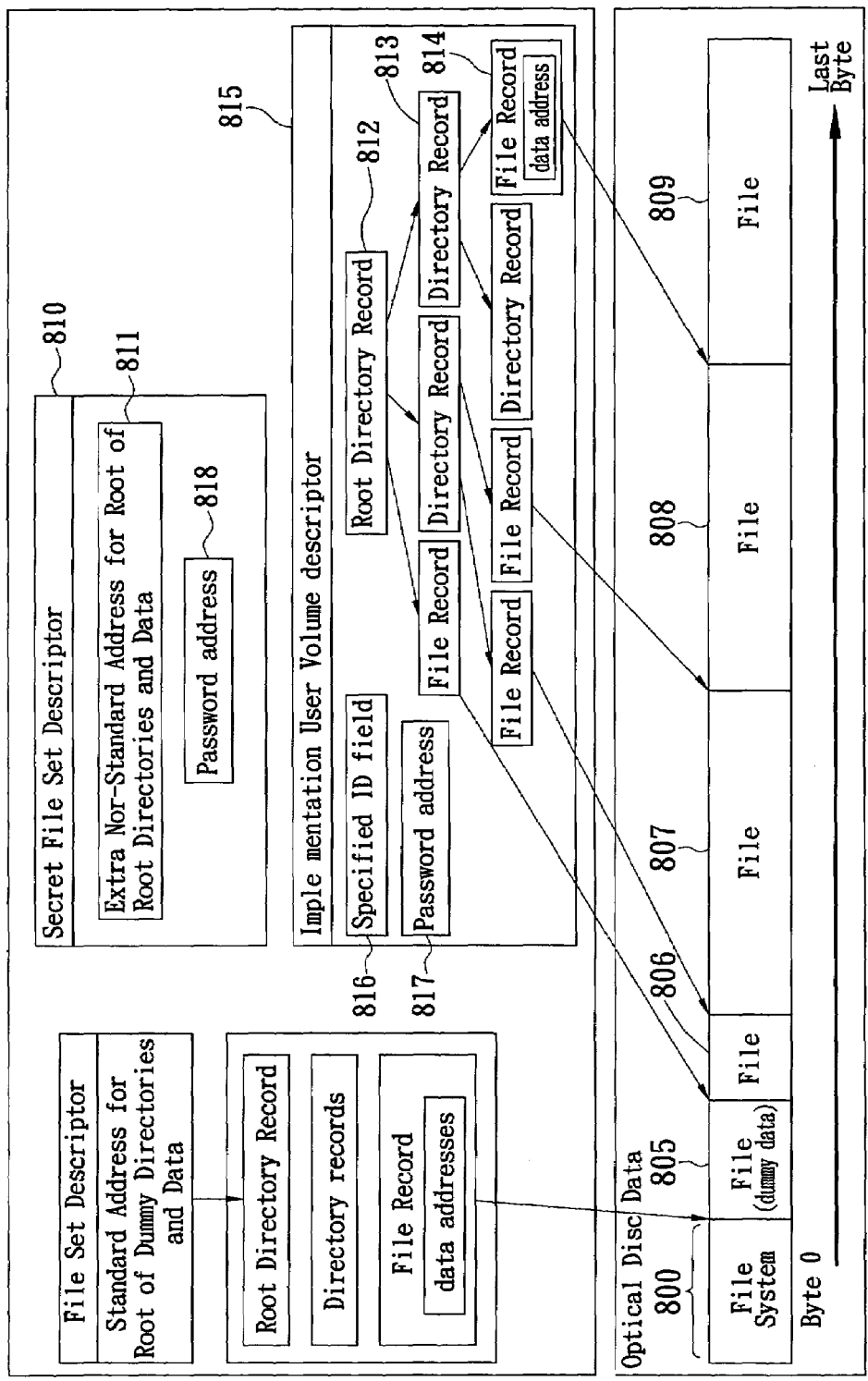
FIG. 8 the schematic diagram of UDF file system implement and conversion to optical disc data in the preferred embodiment of the present invention.

Next, refer to FIG. 5: a first sub-flow-chart of the confidential disc encoding process in the preferred embodiment of the present invention and FIG. 8: the schematic diagram of UDF file system implement and conversion to optical disc data in the preferred embodiment of the present invention. The diagram in FIG. 5 shows the first stage of creating temporary file system S50, which is creating standard file set 50A. The first step in creating standard file set 50A is to import directory tree of dummy data from a source. It could come from a preset sample menu or another specified folder S502. The directory tree of dummy data is stored in the UDF directory structure in UDF file system 822. Wherein, the directory tree consists of root directory record 802, directory records 803 and file records 804. Although we already knew that file records contains data addresses that point to some dummy data content 805; however, the dummy data 805 does not need to be a meaningless data. It could be any data, which is allowed for public viewing and playing by using an optical disc player/reader. Afterwards, the descriptors that describe the whole file system are created in UDF file system S504. Then, UDF assigns a disc address for the root directory record 821 of the dummy directory tree S506. The root directory is saved in a file set descriptor 801 once the root directory of dummy directory tree has been defined, the UDF file system would start reading the imported dummy directory tree S508. The rest of the directory tree (directory records 803 and file records 804) is then converted into UDF filing format and each of them are assigned with a disc address S510. The stage of creating standard file set 50A is now completed and it contains file system and data that any optical disc reader/player can read.

Because some application layer specifies fixed address for some data on an optical disc, thereby the file system this invention modifies will be affected. Hence, it is recommended that dummy directory and its related data should always comply with both application layer and file system. In other words, dummy data should be placed at the fixed address or addresses specified by an application layer.

Figure 6:
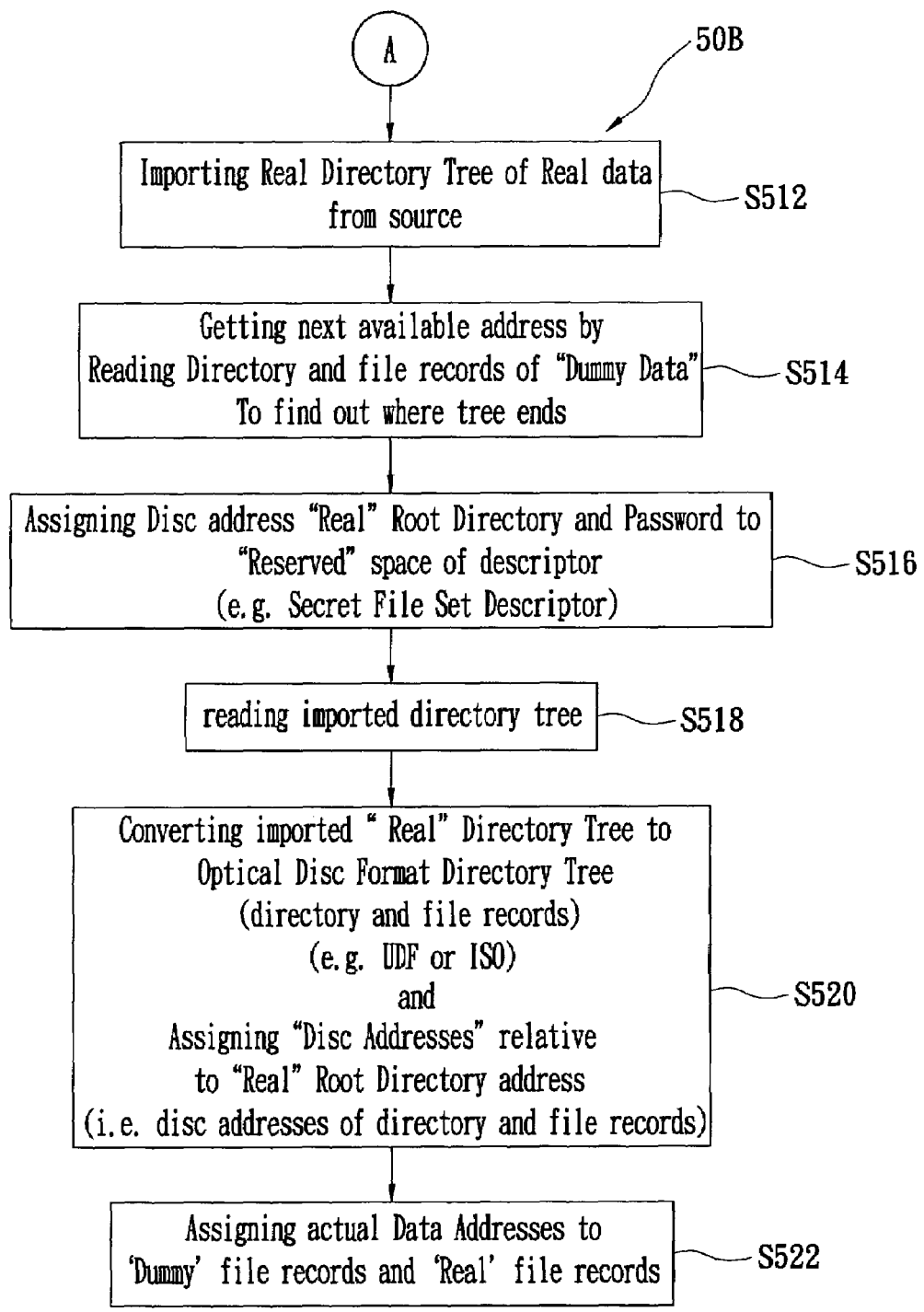
FIG. 6 is a second sub-flow-chart of the confidential disc encoding process in the preferred embodiment of the present invention.

Now, the next step is to enter the stage of creating parallel file set with real data 50B. Please refer to FIG. 6: a second sub-flow-chart of the confidential disc encoding process in the preferred embodiment of the present invention and FIG. 8: the schematic diagram of UDF file system implementation and conversion to an optical disc data in the preferred embodiment of the present invention. The first step of this stage is to import directory tree of real data from a source S512. The source could be an actual specified folder from hard disc, CD or DVD etc. The UDF file system will now read the dummy directory tree and find out where the tree ends in order to define the next available address as the start of secret file set descriptor 810 in the preferred embodiment of the present invention S514. The secret file set descriptor 810 belongs to the non-standard directory files and records in the UDF system. Because only a specified optical disc burner using the encoding method according to present invention can define the address of secret file set descriptor 810 and reserve it for storing information that relate to a confidential disc. Therefore, only a specified reader/player knows how and where to find this reserved descriptor. Now, the UDF system assigns a disc address 811 to the root directory record 812 of the above-mentioned real directory tree S516. Next, the UDF reads the imported real directory tree S518 and then the rest of the directory tree (directory records 813 and file records 814) would be converted into the UDF filing format. Each of the directory records 813 and file records 814 is then assigned with a disc address S520. Finally as described in the precedent article, the data addresses that should contain inside of dummy or real file records are finally assigned S522. As shown on the FIG. 8, the data addresses in real file records point to the real data files/contents on an optical disc (e.g. file 806, file 807, file 808, file 809).

Further, the above mentioned real directory tree is actually stored in an implementation use volume descriptor 815 and the address for finding the real root directory 811 is stored in the secret file descriptor 810. The implementation use volume descriptor 815 is another descriptor inside the UDF file system 300. It is designed for use by another implementation (e.g. for your eyes only) to identify another "volume" that only another specified burner/player/reader can read. Therefore, the implementation use volume descriptor 815 is the most appropriate and safest place to store the real directory tree. Hence, the preferred embodiment of the present invention stores the real directory tree in this descriptor rather than the secret UDF directory structure 312.

Furthermore, for the same reason, the implementation use volume descriptor 815 is therefore also used to store a specified ID field 816, which is an identification mark for a present invention complying specified reader/player, and the actual data-accessing password 817. The data-accessing password 817 can be found by a password address 818 contained inside the secret file set descriptor 810.

In contrast to dummy data, if the application layer disregarding the file system and fixes the addresses, some reader/player will play the content of the confidential disc without referring to the file system at all. In order to avoid a non-specified reader/player from playing real data, the real data should not be placed at an address or addresses specified by an application layer. The specified reader/player should hence always depend on the real directory tree and not any absolute addresses fixed by an application layer for finding any real data.

Although the real root directory 812, specified ID field 816 and data-accessing password 817 mentioned in the precedent article are stored in the implementation use volume descriptor 815. However, it is not the only place that these fields can be placed. They can be allocated any where on an optical disc, as long as the storing space does not have a piece of data or descriptor's address fixed by a file system or an application layer.

Figure 7:
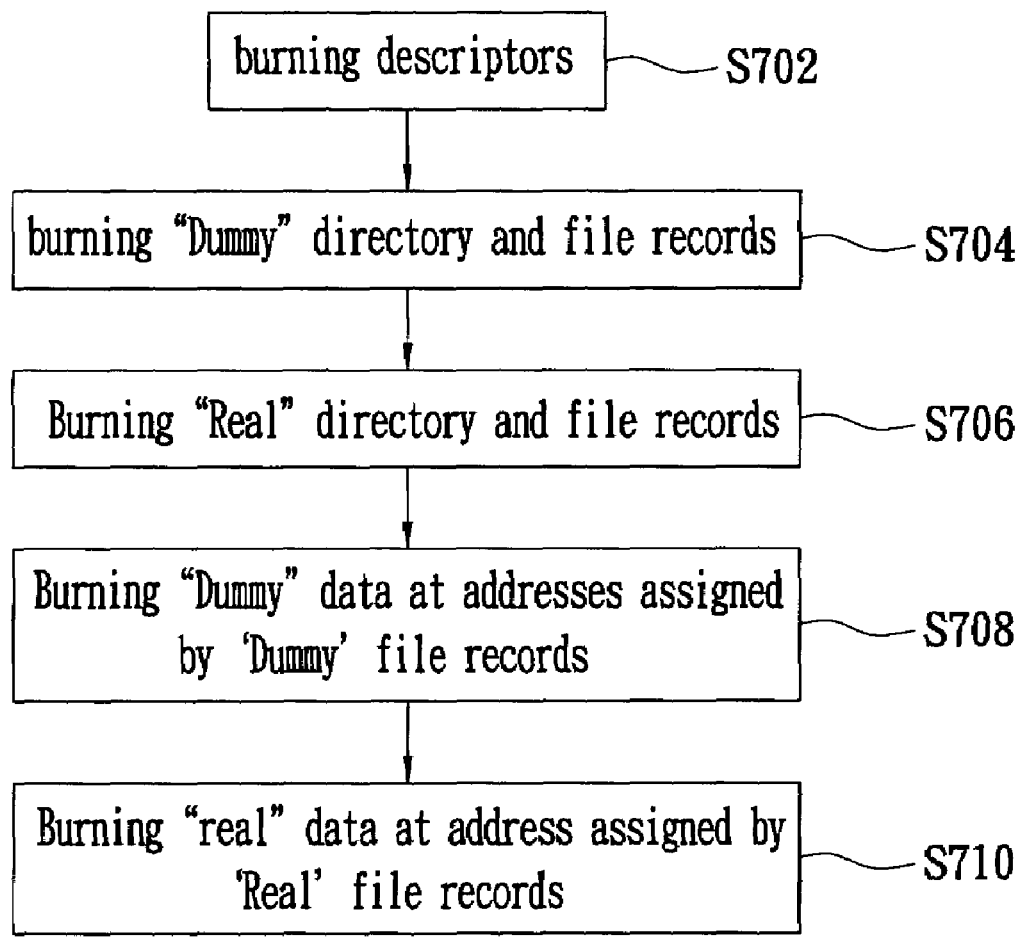
FIG. 7 the third sub-flow-chart of the disc encoding process for the preferred embodiment of the present invention.

Please refer to the FIG. 7: the third sub-flow-chart of the disc encoding process for the preferred embodiment of the present invention and FIG. 8: the schematic diagram of UDF file system implement and conversion to optical disc data in the preferred embodiment of the present invention. FIG. 7 is the sub flow-charts that representing the step of Burn Buffer to Disc S70 in the FIG. 4: flow-chart of a confidential optical disc encoding process in the present invention. The optical disc burner firstly burns the descriptors of the file system 800 onto the optical disc S702. Then, it burns the dummy directory and file records into the UDF directory structure 822 of the file system onto the optical disc S704.

Similarly, it then burns real directory and file records into the implementation use volume descriptor 815 of the file system onto disc S706. The above-mentioned descriptors, dummy directory and records and real directory and records are all burned into the file system zone 800 in front of all the data content. Behind the file system zone 800 is where the burner will burn on all the files/data content at the different addresses assigned by dummy file records S708 and real data records S710.

Second Preferred Embodiment

Figure 9:
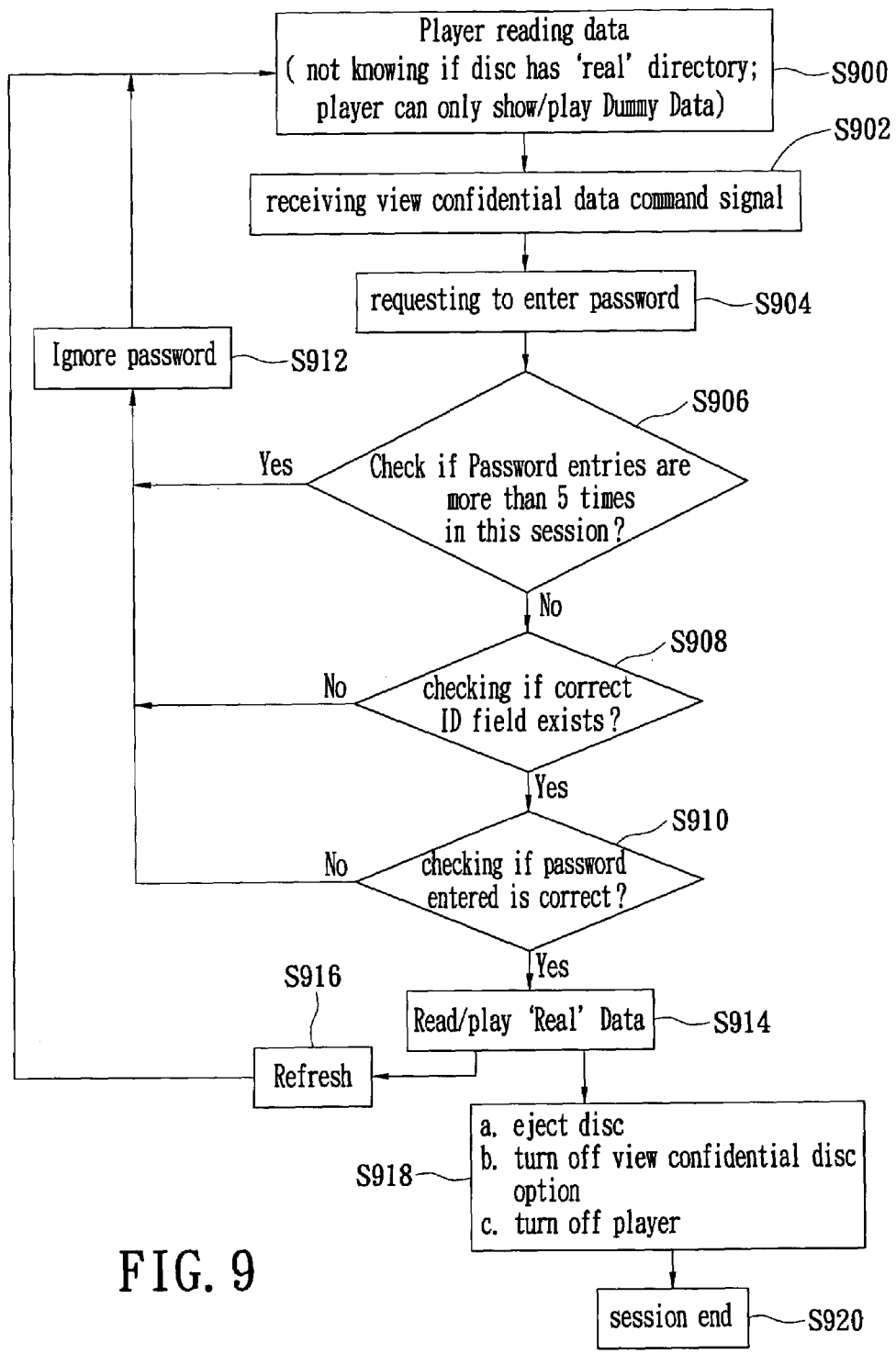
FIG. 9 the flow-chart of the disc reading process in the preferred embodiment of the present invention.

This preferred embodiment of the present invention relates to a method for reading confidential optical disc. This method is applied by a specified player/reader to play an optical disc, which is encoded by the previously said method in first preferred embodiment. Refer to FIG. 9: the flow chart of the disc reading process in the preferred embodiment of the present invention. The first step is for a player/reader to read the inserted optical disc data S900. At this stage, any player, including specified player (e.g. power DVD player), does not know if the inserted optical disc is an ordinary disc or a confidentially encoded disc. Therefore the player/reader will only show and play the dummy data, which is designed to be read by any reader/player. However, only if a specified player/reader were used and a view confidential disc command was received, then could the real data be possibly identified S902 by a specified player. However, before viewing the real data (if there is any) the specified player will request for a password and also count whether if there has been more than five password entries in this session S906. If there is, then the player will disregard the correctness of the password and ignore it and other further entries completely S912. Otherwise, if the password entered has not yet exceeded five time limits, then the player will proceed to check if the correct ID field exists in the file system S908. If the specified player/reader does find a correct ID field in the system, it will proceed further and check the accuracy of the password entered S910. However, if there is no correct ID field in the file system then the player will again proceed to ignore the password entered step S912. Now, the player/reader will play the real data if the entered password is correct S914, if not the player will ignore the password entered S912. Furthermore, the player will go back to read dummy data if a refresh signal is received while viewing or playing the real data. In this situation, a correct password will need to be entered again through procedure step S900 to S910 as a new session. Another situation is that the player/reader receives signal of ejecting disc, turning off player/reader or turning off view confidentially encoded disc while viewing the real data S918, then the reading process session will end S920.

Although the present invention has been described with reference to the preferred embodiment thereof, it will be understood that the invention is not limited to the details thereof. Various substitutions and modifications have suggested in the foregoing description, and other will occur to those of ordinary skill in the art. For example, the optical disc can be one of CDRW, DVDRW, and DVD RAM. The data source is one of hard disc, CD, DVD and DVD RAM. Therefore, all such substitutions and modifications are intended to be embraced within the scope of the invention as defined in the appended claims.

What is claimed is:

1. A method for encoding a confidential optical disc with a burner, the method comprising the steps of:
    receiving a signal for creating the confidential optical disc to switch a burner into a burning mode;
    setting a data-accessing password for future verification, wherein the data-accessing password is placed to a secret file set descriptor and allocated on any unoccupied space of an optical disc, wherein the secret file set descriptor is a non-standard file and stores a preset address pointing to a root directory record of a real directory tree;
    selecting one of data sources for public viewing and confidential viewing data to be burned on the disc;
    receiving a start burn signal to begin a data encoding process;
    creating a temporary file system as a buffer that includes two stages:
        creating a standard file set comprising a standard file system including a dummy directory tree pointing to dummy data, wherein the standard file system defines the next available address as the start of the secret file set descriptor, and
        creating a parallel file set comprising the secret file set descriptor and the real directory tree pointing to real data; and
    burning the buffer to the optical disc to produce the confidential optical disc.

2. The method of claim 1, wherein the burner is an optical disc writer associated with a computer or other consumer device.

3. The method of claim 1, wherein the optical disc is a CDRW.

4. The method of claim 1, wherein the optical disc is a DVDRW.

5. The method of claim 1, wherein the optical disc is a DVD RAM.

6. The method of claim 1, wherein the selected data source is a hard disc.

7. The method of claim 1, wherein the selected data source is a CD.

8. The method of claim 1, wherein the selected data source is a DVD.

9. The method of claim 1, wherein the selected data source is a DVD RAM.

10. The method of claim 1, wherein the file system is a UDF file system.

11. The method of claim 1, wherein the file system is an ISO 9660 file system.

12. The method of claim 1, wherein the creating standard file set stage further comprises the following steps:
    importing a directory of dummy data from a data source;
    creating descriptors that describe the whole file system;
    assigning a address of a root directory to a descriptor;
    reading the imported directory tree;
    converting the imported directory and files into an optical disc format according to file system; and
    assigning addresses to directories and file records for pointing to the dummy data.

13. The method of claim 12, wherein the standard file set is created according to a UDF file system.

14. The method of claim 12, wherein the standard file set is created according to an ISO 9660 file system.

15. The method of claim 12, wherein the data source is a hard disc folder.

16. The method of claim 12, wherein the data source is a CD.

17. The method of claim 12, wherein the data source is a DVD.

18. The method of claim 12, wherein the data source is a DVD RAM.

19. The method of claim 12, wherein the data source is a sample menu.

20. The method of claim 12, wherein the descriptor in the step of assigning a disc address of a root directory to a descriptor is a file set descriptor.

21. The method of claim 1, wherein the creating parallel file set stage further comprises the following steps:
   importing a directory tree of real data from the source;
   getting the next available address by reading a directory and file records of dummy data to find out where directory tree ends in order to place next descriptor and data;
   assigning address to real root directory and data-accessing password to a descriptor;
   reading the imported directory tree;
   converting the real directory and files into optical disc format according to file system;
   assigning addresses to directories and file records; and
   assigning different data addresses to dummy file records and real file records.

22. The method of claim 21, wherein the selected data source is a hard disc folder.

23. The method of claim 21, wherein the selected data source is a CD.

24. The method of claim 21, wherein the selected data source is a DVD.

25. The method of claim 21, wherein the selected data source is a DVD RAM.

26. The method of claim 21, wherein the directory imported from real data in the step of importing directory tree of real data from source is placed to a descriptor.

27. The method of claim 21, wherein the directory imported from real data in step of importing directory tree of real data from source is placed to anywhere on the disc that does not have a piece of data or descriptor's addressing fixed by file system or application layer.

28. The method of claim 1, wherein the step of burning a buffer to an optical disc further comprises the following steps:
   burning descriptors;
   burning dummy directory and file records;
   burning real directory and file records;
   burning dummy data at addresses assigned by dummy file records; and
   burning real data at addresses assigned by real file records.

29. A method for reading and decoding a confidential optical disc produced by claim 1, the method comprising the steps of:
   a player reading optical disc data;
   receiving a view confidential data command signal;
   requesting entry of a data-accessing password;
   comparing the entered password with a data-accessing password placed in a secret file set descriptor allocated on any unoccupied space of an optical disc, wherein the secret file set descriptor is a non-standard file and stores a preset address pointing to a root directory record of a real directory tree;
   if the entered password is correct, playing or reading real data, wherein the real data of the optical disc is pointed by the preset address; and
   ending the playing/reading session.

30. The method of claim 29, wherein ending the playing/reading session comprises:
   ejecting the optical disc;
   turning off a view confidential data option;
   turning off the player reader.

31. The method of claim 29, further comprising:
   determining if the password entries entry reaches a predetermined limitation;
   if the password entries entry does not reach the predetermined limitation, checking if a correct ID field exists; and
   if the ID field exists in the optical disc, checking if the entered password is correct.

32. The method of claim 31, further comprising: if the number of password entries reaches a predetermined limitation of five, ignoring any further entries until player reads optical disk data.

33. The method of claim 31, further comprising: if the player can not find the ID field or the ID field does not exist, then ignoring the entered password until the player reads the optical disc data again.

34. The method of claim 31, further comprising: if the entered password is incorrect, ignoring the entered password until the player reads optical disc data again.

* * * * *